(12) United States Patent
Wan et al.

(10) Patent No.: US 11,093,263 B2
(45) Date of Patent: Aug. 17, 2021

(54) RESOURCE MANAGEMENT BASED ON USER INTERFACES

(71) Applicant: INTERNATIONAL BUSINESS MACHINES CORPORATION, Armonk, NY (US)

(72) Inventors: Shu Chao Wan, Beijing (CN); Jing Jing Pan, Beijing (CN); Xin Peng Liu, Beijing (CN); Yiwen Huang, Markham (CA); Ye Cui, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 16/387,629

(22) Filed: Apr. 18, 2019

(65) Prior Publication Data

US 2020/0334053 A1 Oct. 22, 2020

(51) Int. Cl.
*G06F 9/46* (2006.01)
*G06F 9/451* (2018.01)
*G06F 9/50* (2006.01)

(52) U.S. Cl.
CPC ............ *G06F 9/452* (2018.02); *G06F 9/5077* (2013.01); *G06F 2209/5011* (2013.01)

(58) Field of Classification Search
CPC ............................... G06F 9/452; G06F 9/5077
See application file for complete search history.

(56) References Cited

U.S. PATENT DOCUMENTS

| 7,949,999 | B1 | 5/2011 | Willeford | |
| 10,079,720 | B2 | 9/2018 | Turcu | |
| 2010/0185902 | A1 | 7/2010 | Fang | |
| 2012/0297054 | A1* | 11/2012 | Breiter | G06F 11/3051 709/224 |
| 2013/0166509 | A1 | 6/2013 | Clark | |
| 2020/0228412 | A1* | 7/2020 | Abu Asba | H04L 41/22 |

OTHER PUBLICATIONS https://developer.android.com/training/backward-compatible-ui/, "Create backward-compatible UIs", Android Developers, Accessed on Feb. 19, 2019, 2 pages.
Mell et al., "The NIST Definition of Cloud Computing", Recommendations of the National Institute of Standards and Technology, Special Publication 800-145, Sep. 2011, 7 pages.
https://cloud.google.com/endpoints/docs/frameworks/python/handling-api-versioning, "Handling API Versioning", recommendations for managing API versions, Accessed on Dec. 11, 2018, 5 pages.

* cited by examiner

*Primary Examiner* — Wissam Rashid
(74) *Attorney, Agent, or Firm* — Ewa M. Wozniak

(57) ABSTRACT

The present disclosure provides a method, computer system and computer program product for generating a conversation content. According to the method, a rule corresponding to a first component of a user interface can be obtained, wherein the first component represents one or more resources provided to a user, an operation for the first component can be determined based on the rule and a feature of the first component, a virtual component tree can be constructed according to the operation, wherein the virtual component tree depicts components to be included in the user interface and relationship between the components; and the user interface can be rendered based on the virtual component tree.

15 Claims, 6 Drawing Sheets

RESOURCE MANAGEMENT BASED ON USER INTERFACES

BACKGROUND

The present invention relates to resource management, and more specifically, to resource management based on a user interface. In network environments, such as a cloud environment, the amount of resource requirements keeps increasing due to additional applications and services offered to clients. Thus, managing various types of resources is needed.

SUMMARY

According to one embodiment of the present invention, a computer-implemented method for resource management is provided. According to the method, a rule corresponding to a first component of a user interface is obtained, wherein the first component represents one or more resources provided to a user. An operation for the first component is determined based on the rule and a feature of the first component. A virtual component tree is constructed according to the operation, wherein the virtual component tree depicts components to be included in the user interface and relationship between the components. Then the user interface can be rendered based on the virtual component tree.

According to another embodiment of the present invention, a computer system is provided. The computer system comprises a processor, a computer-readable memory coupled to the processor. The computer-readable memory comprises instructions that when executed by the processor perform actions of: obtaining a rule corresponding to a first component of a user interface, wherein the first component represents one or more resources provided to a user, determining an operation for the first component based on the rule and a feature of the first component, constructing a virtual component tree according to the operation, wherein the virtual component tree depicts components to be included in the user interface and relationship between the components, and rendering the user interface based on the virtual component tree.

According to another embodiment of the present invention, a computer program product is provided. The computer program product comprises a computer readable storage medium having program instructions embodied therewith, the program instructions executable by a processor to cause the processor to perform actions of: obtaining a rule corresponding to a first component of a user interface, wherein the first component represents one or more resources provided to a user, determining an operation for the first component based on the rule and a feature of the first component, constructing a virtual component tree according to the operation, wherein the virtual component tree depicts components to be included in the user interface and relationship between the components, and rendering the user interface based on the virtual component tree.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
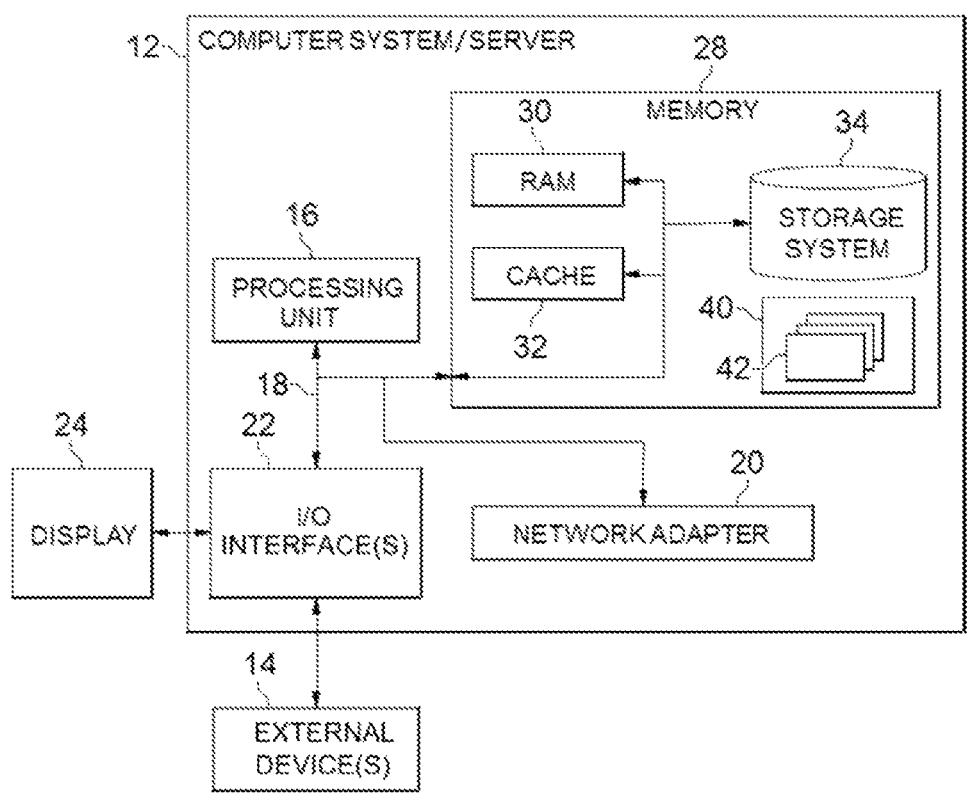
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
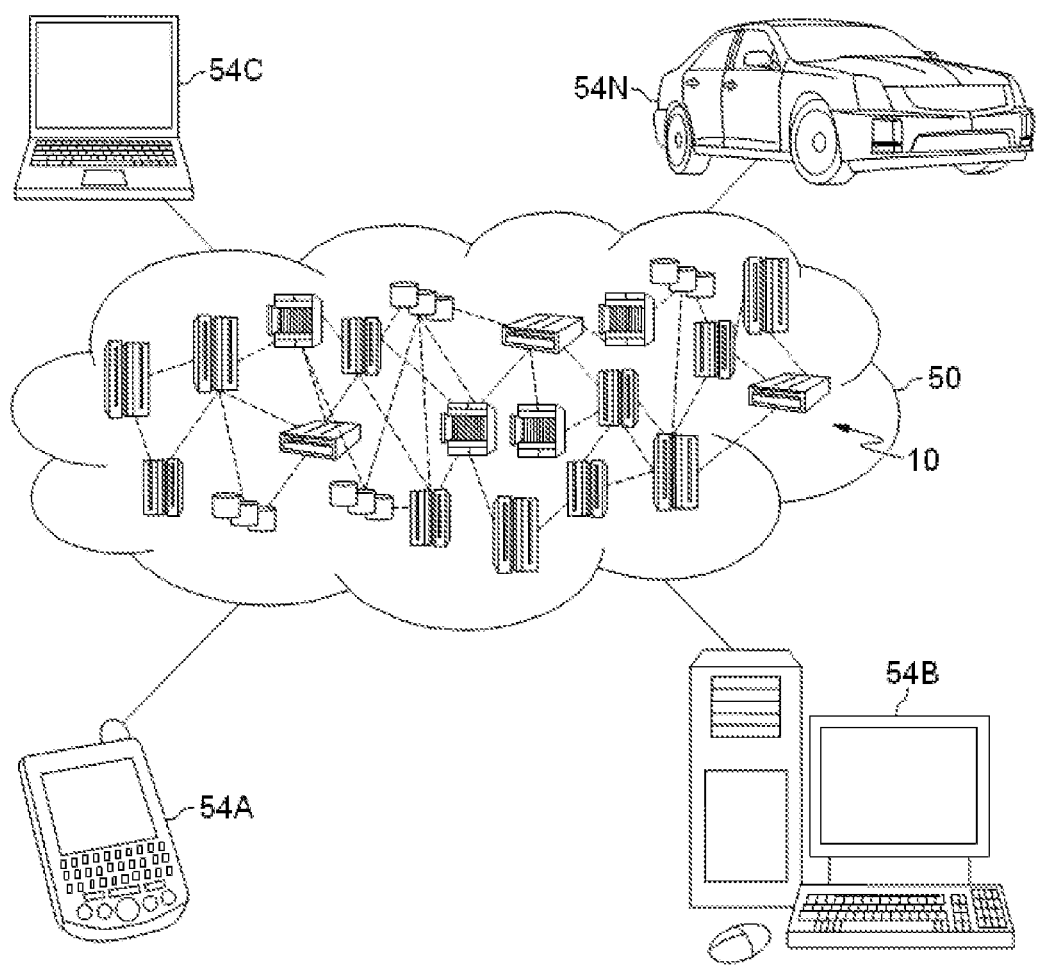
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
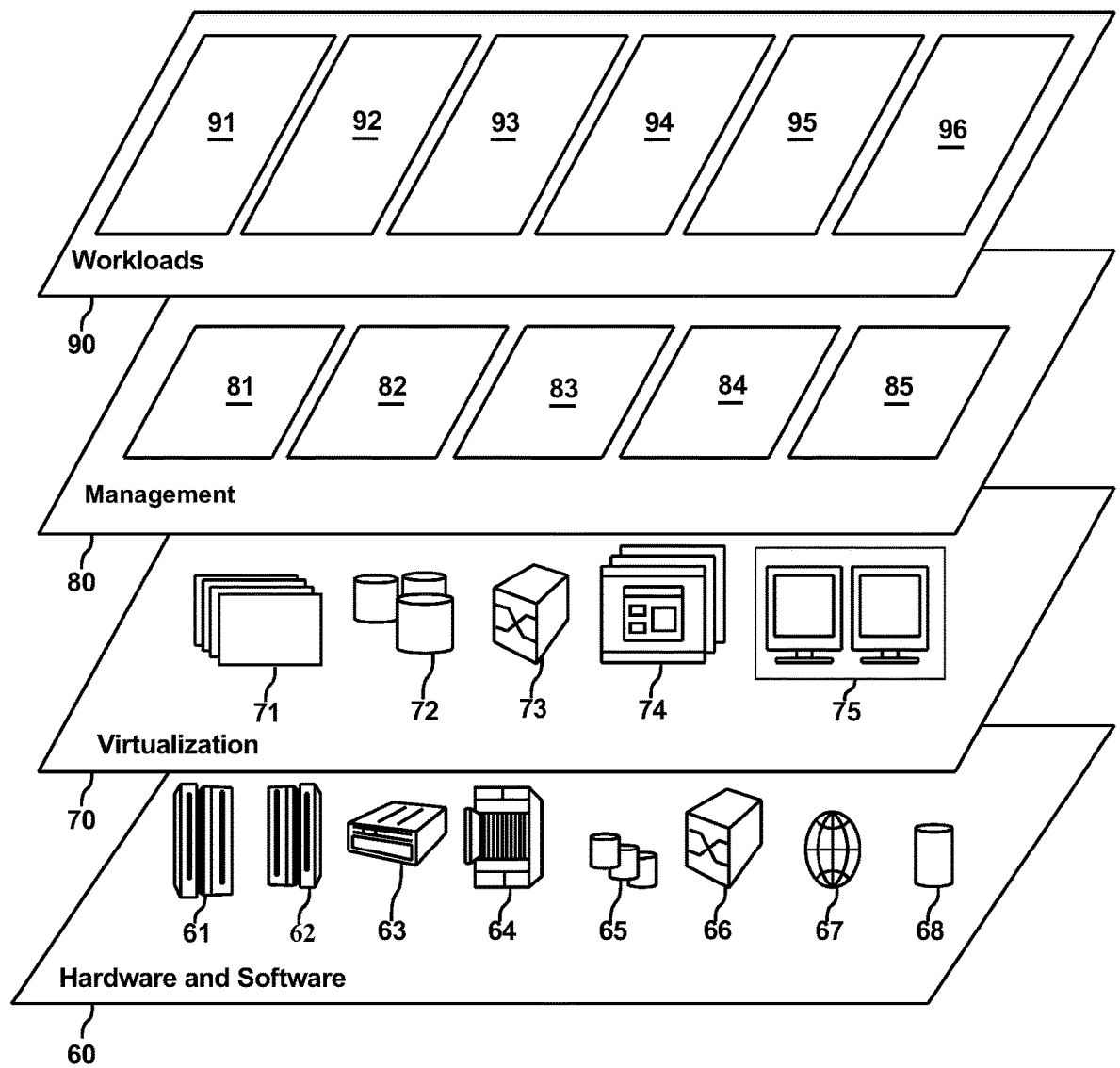
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource management 96.

In network environments, resources such as applications or services provided to users may change over time. For example, besides previously deployed resources, new resources may be added to resource provisions in development or production environments. Moreover, an application can be updated to another application or an application of an older version can be updated to an application of a newer version.

These new or updated resources can be divided into, for example, resources that conflict with one or more deployed resources and resources that do not conflict with the deployed resources. There is a need to handle both deployed resources and resources to be deployed in a consistent way.

Embodiments of the present disclosure provide consistent approaches to manage resources in different environments by managing versioning features to benefit both existing resource instances and new resource instances with low maintenance effort, and with flexibility. According to embodiments of the present disclosure, a user interface (UI) may be used to manage resources. As an example, the UI is displayed in a device operated by a user who consumes resources. There may be one or more components included in the UI. The one or more components may correspond to the one or more resources provided to the user. The one or more resources can be applications or services.

Figure 4:
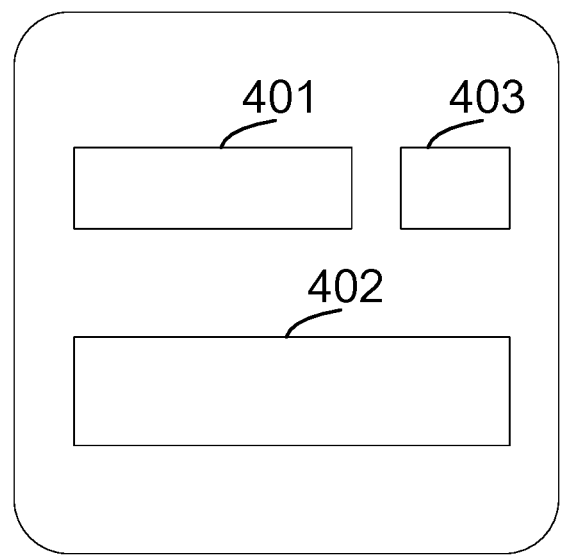
FIG. 4 depicts a schematic diagram of an example user interface according to an embodiment of the invention.

Referring now to FIG. 4, an example UI 400 according to embodiments of the present disclosure is depicted. The UI 400 includes one or more components. For example, component 401 can be a server table, component 402 can be a storage table, and component 403 can be a button for the component 401. It shall be understood that the UI 400 may include less than or more than three components and may include one or more components not shown in FIG. 4.

According to embodiments of the present disclosure, one or more rules may be set by a developer, a user, a platform operator or a resource provider for one or more components of a user interface. It shall be understood that a rule can be set for one or more components, and one or more rules can be set for a component. The rules may be stored in a database, for example, a centralized server that is accessed by multiple user devices.

As an example, rules may include conditions and operations corresponding to the conditions. Conditions may include, for example, ranges of version numbers, release times or providers. In the example of Table 1, a mapping between conditions and operations for an example component "Server Table" is illustrated. In this example, if the version number of the component "Server Table" is larger than or equal to 2.2, the corresponding operation can be updated, which indicates the component "Server Table" can be included in the user interface. If the version number of the component "Server Table" is lower than 2.2, the corresponding operation may be hiding, which indicates the component "Server Table" may not be included in a user interface. It shall be understood that the conditions and operations in Table 1 are used to describe embodiments of the present disclosure, other suitable conditions and operations now known or to be developed can also be applied to embodiments of the present disclosure.

TABLE 1

| Condition | Operation |
| --- | --- |
| version larger than or equal to 2.2 | update |
| version lower than 2.2 | hiding |

As another example, a mapping between conditions and operations for a component "Storage Table" is illustrated in Table 2. In this example, if the version number of the component "Storage Table" is larger than or equal to 2.5, the corresponding operation can be updated, which indicates the component "Storage Table" can be included in the user interface. If the version number of the component "Storage Table" is lower than 2.5 and no alternative component is found, the corresponding operation can be hiding. If the version number of the component "Storage Table" is lower than 2.5 and an alternative component is found, the corresponding operation can be replaced, which indicates the alternative component may be included in the user interface. It shall be understood that the conditions and operations in Table 2 are used to describe embodiments of the present disclosure, other suitable conditions and operations now known or to be developed can also be applied.

TABLE 2

| Condition | Operation |
| --- | --- |
| version larger than or equal to 2.5 | update |
| version lower than 2.5, no alternative | hiding |
| version lower than 2.5, with alternative | replacement |

As a further example, a mapping between conditions and operations for a component "Storage Widget" is illustrated in Table 3. In this example, if the release time of the component "Storage Widget" is later than a preset date, for example, Jan. 1, 2019, the corresponding operation can be updated, which indicates the component "Storage Widget" can be included in the user interface. In other conditions, the operation for the component "Storage Widget" can be hiding. It shall be understood that the conditions and operations in Table 3 are used to describe embodiments of the present disclosure, other suitable conditions and operations now known or to be developed can also be applied.

TABLE 3

| Condition | Operation |
| --- | --- |
| release time later than Jan. 1, 2019 | update |
| others | hiding |

Figure 5:
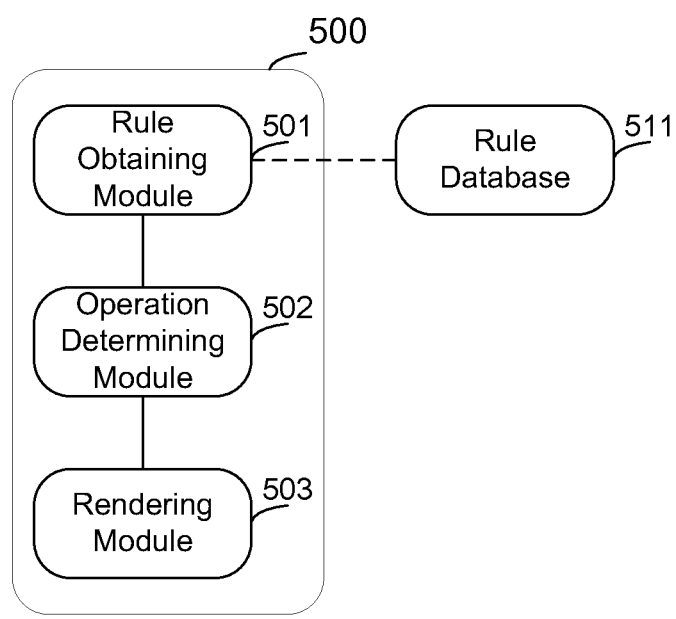
FIG. 5 depicts a schematic diagram of an example device according to an embodiment of the invention.

Referring now to FIG. 5, an example device 500 operated by a user according to embodiments of the present disclosure is depicted. According to embodiments of the present disclosure, during rendering a UI on the device 500, the device 500 can determine a list of components to be deployed based on the resource requirements or the other configurations. For each of the components to be deployed, one or more features of the components, such as a component name, a version number, or other properties, may be determined by analyzing a profile of the component or may be obtained directly from a resource provider.

According to embodiments of the present disclosure, a rule obtaining module 501 of the device 500 may try to obtain a rule corresponding to each of the components to be deployed. As an example, the rule obtaining module 501 may send a request to a rule database 511 storing rules for a different component and then receive a rule corresponding to each of the components to be deployed. In some embodiments, the rule database 511 can be in a separate device outside of the device 500. In some other embodiments, the rule database 511 can be a module in the device 500.

Figure 6:
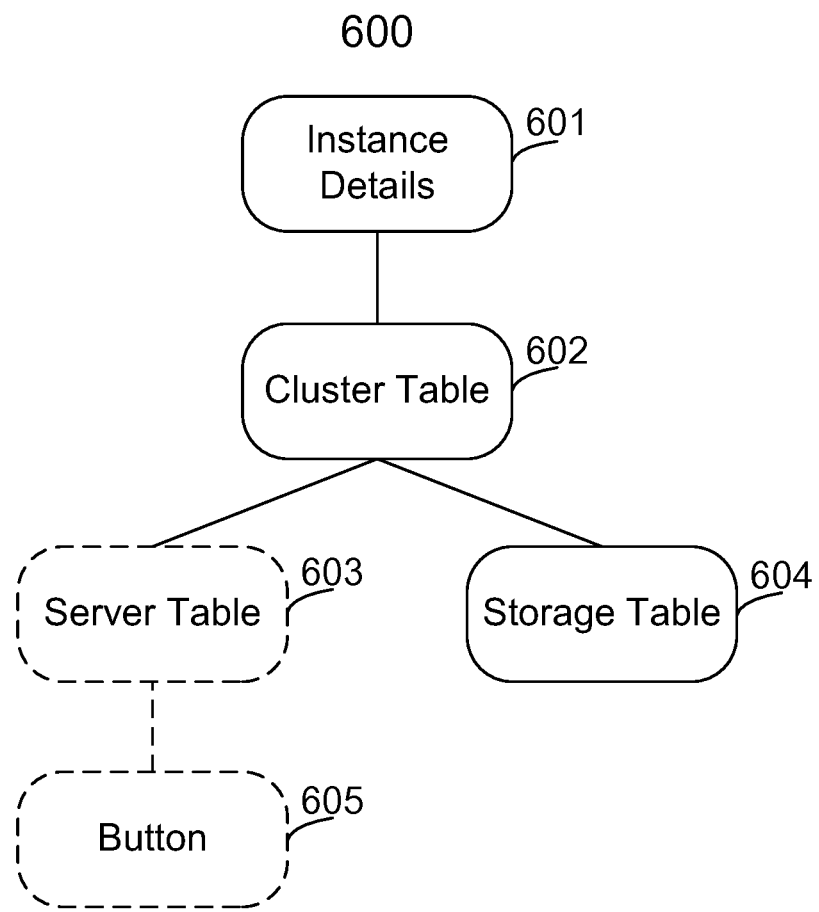
FIG. 6 depicts a schematic diagram of an example virtual component tree according to an embodiment of the invention.

According to embodiments of the present disclosure, an operation determining module 502 of the device 500 can determine operations based on the obtained rules and features of the components to be deployed. A virtual component tree can be constructed according to the operations by a rendering module 503 of the device 500. The virtual component tree will be described in the following and an example of the virtual component tree is shown in FIG. 6.

The operations for the components may include updating, hiding or replacing. It shall be understood that other operations may also be applied in embodiments of the present disclosure.

In one or more embodiments, in response to a feature of a first component, such as a version number, a release time or a provider, to be deployed complying with a first condition of the obtained rule, the operation determining module 502 may determine the operation corresponding to the first component to be "update". In some embodiments, a component included in the user interface may be replaced by the first component. As a further example, the first component may have one or more data fields, such as a title, data contents or a status. If the operation for the first component is determined to be "update", then one or more data fields of a component corresponding to the first component may be included in the user interface and may be updated by the one or more data fields of the first component. As a further example, one or more sub-components or functions of the first component can be hidden according to the one or more data fields of the first component even though the first component is included in the user interface. In some other embodiments, if there is no component to be replaced by the first component existing in the user interface, then the first component can be included in the user interface without replacing any existing component in the user interface.

In response to the feature of the first component complying with a second condition of the obtained rule and no alternative component of the first component existing, the operation determining module 502 can determine the operation of the first component to be "hiding". In response to the feature of the first component complying with a second condition of the obtained rule and an alternative component of the first component existing, the operation determining module 502 can determine the operation to be "replacement".

The alternative component can be determined by comparison of virtual component trees of different versions, and information about the alternative component can be stored in a device or a server that can be accessed by the device 500. For example, a newer version and an older version of virtual component trees can be compared, and the difference between the virtual component trees can be determined. The alternative component can be selected from the differential components of virtual component trees of different versions based on one or more selection rules. For example, a component with data contents similar to the first component can be selected from the differential components as an alternative component. In some other embodiments, the alternative component can be determined by accessing configuration of the user, a developer, a platform operator, or a resource provider.

In one or more embodiments, for a component determined with an operation "update", this component may be added to the virtual component tree, wherein the virtual component tree depicts components to be included in the user interface and in a relationship between the components. For example, the virtual component tree can depict a dependency or a hierarchical structure of components to be included in the user interface. In this example, relationship between the first component and the other components in the virtual component tree can be determined by analyzing features or data fields of the first component and the other components or by accessing configurations of the user, the developer, or the provider of the resources. Then the first component may be added to a suitable location in the virtual component tree. The virtual component tree may be a table, a list, a graph, or a data structure.

In some embodiments, if no component to be replaced by the first component exists in the virtual component tree, the first component can be added to the virtual component tree directly. If one or more components to be replaced by the first component exists in the virtual component tree, the first component can be added to the virtual component tree to replace the one or more components. As a further example, if no component exists in the virtual component tree, the first component can be added to the virtual component tree as an initial component. If one or more components exist in the virtual component tree, the first component can be added to the virtual component tree as an additional component. In one or more embodiments, the virtual component tree can be stored in the device 500 or in a device outside of the device 500.

For a component with an operation "hiding", this component may not be added to the virtual component tree. In some other embodiments, the component with the operation "hiding" may also be added to the virtual component tree but with a label indicating that the component will not be included in the UI.

For a component with an operation "replacement", an alternative component may be added to the virtual component tree. In some embodiments, a rule of the alternative component may further be obtained. The rule obtaining module 501 may determine the operation of the alternative component and the virtual component tree can be constructed based on the operation of the alternative component and operations of other components.

Taking the component "Storage Table" as an example, the device 500 can determine features (e.g. a version number, a release time or a provider) of the component "Storage Table", and then a rule (e.g., the rule in Table 2) may be obtained by the rule obtaining module 501 from the rule database 511.

As an example, if the version number of the component "Storage Table" is 2.6, which complies with the condition "version larger than or equal to 2.5" of the obtained rule, the operation can be determined as "update". The rendering module 503 will add the component "Storage Table" into the virtual component tree. As the component "Storage Table" may depend on the component "Cluster Table", the component "Storage Table" is added to the virtual component tree as a child component of "Cluster Table".

As another example, if the version number of the component "Storage Table" is 2.4, which complies with the condition "version lower than 2.5" of the obtained rule, and no component is found as an alternative of the component "Storage Table", the operation can be determined as "hiding". The rendering module 503 may not add the component "Storage Table" into the virtual component tree. In some other embodiments, the component "Storage Table" may still be added to the virtual component tree and a label indicating that the component will not be included in the UI can be assigned to the component "Storage Table".

As another example, if the version number of the component "Storage Table" is 2.4, which complies with the condition "version lower than 2.5" of the rule, and a component "Storage Widget" is found by the rendering module 503 as an alternative of the component "Storage Table", then the operation can be determined as "replacement". The rendering module 503 will add the component "Storage Widget" into the virtual component tree instead of the component "Storage Table". In some embodiments, a rule of the component "Storage Widget" may further be obtained by the rule obtaining module 501. The operation determining module 502 will determine the operation of the component "Storage Widget" and the virtual component tree can be constructed based on the operation of the component "Storage Widget" and operations of other components by the rendering module 503. As the component "Storage Widget" depends on the component "Cluster Table", the component "Storage Widget" can be added to the virtual component tree as a child component of "Cluster Table".

In one or more embodiments, if the rule obtaining module 501 of the device 500 fails to obtain a rule for one of the components to be deployed, the component with no rule obtained will be added to the virtual component tree directly. In some other embodiments, if the rule obtaining module 501 of the device 500 fails to obtain a rule for one of the components to be deployed, the component with no rule obtained will not be added in the virtual component tree or the component with no rule obtained may be added to the virtual component tree but assigned with a label indicating that the component will not be included in the UI.

Referring now to FIG. 6, an example virtual component tree 600 according to embodiments of the present disclosure is depicted. In this embodiment, the virtual component tree 600 is shown as a graph. It shall be understood that the virtual component tree 600 can also be represented as a table, a list, or a data structure. The virtual component tree 600 represents components that may be included in the user interface and relationship between the components, for example, a dependency structure or a hierarchy structure. A user interface can be rendered based on the virtual component tree 600. Each node in the virtual component tree 600 represents one or more components to be included in the UI. For example, node 601 can be used to represent component "Instance Details", node 602 can be used to represent component "Cluster Table", node 603 can be used to represent component "Server Table", node 604 can be used to represent component "Storage Table", and node 605 can be used to represent component "Button". Relationships of the components can be determined by analyzing features or data fields of the components or by accessing configurations of the user, the developer or the provider of the resources. For example, if "Button" (node 605) depends on "Server Table" (node 603) and is designed for implementing functions related to "Server Table", then "Server Table" can be a parent component of component "Button" in the virtual component tree 600.

In one or more embodiments, during construction of the virtual component tree 600, for a first component to be added to the virtual component tree 600, the rendering module 503 may determine parent components of the first component according to configurations set by developers, resource providers or users. The rendering module 503 may also check operations determined for the parent components. If a parent component corresponds to an operation "hiding", the operation of the first component may be configured or changed to "hiding".

For example, if an operation of the component "Server Table" is determined to be "hiding" and the component "Server Table" is a parent component of the component "Button", then the operation of the component "Button" may be configured or changed to "hiding". In this example, component "Button" and "Server Table" can be assigned labels indicating these two components are not included in the UI.

According to embodiments of the present disclosure, the user interface can be rendered based on the virtual component tree by the rendering module 503. As an example, for a component with an operation determined as "hiding", the component may not be included in the user interface. It shall be understood that known methods may be used to render the user interface using the constructed virtual component tree.

In one or more embodiments, a notice message can also be sent or displayed to the user for a component with an operation "hiding". For example, if the component "Storage Table" is determined with an operation "hiding", then a notice message may be displayed on an area in the UI for informing the user that "Storage Table" is not shown or not included in the UI. Other information related to the component may also be sent or displayed to the user.

Figure 7:
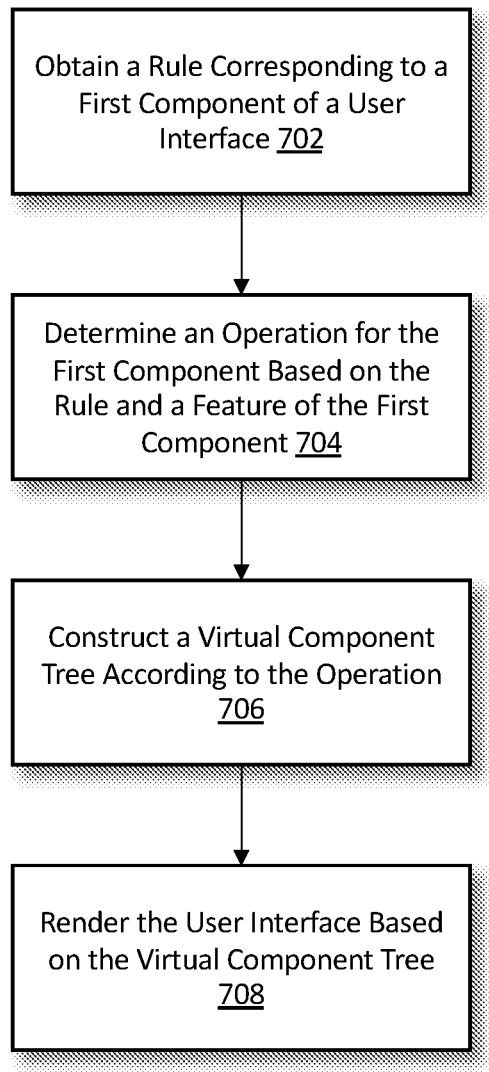
FIG. 7 depicts a flow chart of an example method for resource management according to an embodiment of the present invention.

With reference to FIG. 7, a method 700 for resource management according to embodiments of the invention will be discussed. The method 700 can be implemented by computer system/server 12 of FIG. 1. It shall be noted that the method 700 is only illustrative and is not intended to suggest any limitation as to the scope of use or functionality of embodiments of the present disclosure.

At step 702, a rule corresponding to a first component of a user interface can be obtained. The first component may represent one or more resources provided to a user. At step 704, an operation for the first component can be determined based on the rule and a feature of the first component. At step 706, a virtual component tree can be constructed according to the operation, wherein the virtual component tree depicts structure of components to be included in the user interface. Then at step 708, the user interface can be rendered based on the virtual component tree.

It should be noted that the processing of resource management according to one or more embodiments of the present disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, by one or more processors, a rule corresponding to a first component of a user interface, wherein the first component represents one or more resources provided to a user;
    determining, by one or more processors, an operation for the first component based on the rule and a feature of the first component, the operation includes at least one selected from a group consisting of hiding, updating and replacement, the determining the operation for the first component based on the rule and the feature of the first component comprises:
        in response to an operation of a parent component of the first component being determined as hiding, determining, by one or more processors, the operation of the first component to be hiding;
    constructing, by one or more processors, a virtual component tree according to the operation, wherein the virtual component tree depicts components to be included in the user interface and relationship between the components; and
    rendering, by one or more processors, the user interface based on the virtual component tree.

2. The computer-implemented method of claim 1, wherein the determining the operation for the first component based on the rule and the feature of the first component comprises:
    in response to the feature of the first component complying with a first condition of the rule, determining, by one or more processors, the operation to be update;
    in response to the feature of the first component complying with a second condition of the rule and no alternative component of the first component existing, determining, by one or more processors, the operation to be hiding; or
    in response to the feature of the first component complying with a second condition of the rule and a second component existing as an alternative of the first component, determining, by one or more processors, the operation to be replacement.

3. The computer-implemented method of claim 2, wherein the constructing the virtual component tree according to the operation comprises:
    in response to the operation being determined as update, adding, by one or more processors, the first component to the virtual component tree;
    in response to the operation being determined as hiding:

constructing, by one or more processors, the virtual component tree without the first component; or adding, by one or more processors, the first component to the virtual component tree, and assigning, by one or more processors, a label to the first component, wherein the label indicates the first component not included in the user interface; and in response to the operation being determined as replacement, adding, by one or more processors, the second component to the virtual component tree.

4. The computer-implemented method of claim 3, wherein the adding the first component to the virtual component tree comprises:

in response to no component to be replaced by the first component existing in the virtual component tree, adding, by one or more processors, the first component to the virtual component tree; or in response to a component to be replaced by the first component existing in the virtual component tree, adding, by one or more processors, the first component to the virtual component tree replacing the component to be replaced.

5. The computer-implemented method of claim 3, wherein the adding the second component to the virtual component tree comprises:

obtaining, by one or more processors, another rule corresponding to the second component;

determining, by one or more processors, another operation for the second component based on the another rule and a feature of the second component; and constructing, by one or more processors, the virtual component tree according to the another operation.

6. The computer-implemented method of claim 2, wherein the second component is selected from differential components determined by comparison of virtual component trees of different versions.

7. The computer-implemented method of claim 1, wherein the rule is set by the user, a developer, a platform operator, or a provider of the one or more resources.

8. A computer system comprising:

a processor;

a computer-readable memory coupled to the processor, the computer-readable memory comprising instructions that when executed by the processor perform actions of:

obtaining a rule corresponding to a first component of a user interface, wherein the first component represents one or more resources provided to a user;

determining an operation for the first component based on the rule and a feature of the first component, the operation includes at least one selected from a group consisting of hiding, updating and replacement, the determining the operation for the first component based on the rule and the feature of the first component comprises:

in response to an operation of a parent component of the first component being determined as hiding, determining, by one or more processors, the operation of the first component to be hiding;

constructing a virtual component tree according to the operation, wherein the virtual component tree depicts components to be included in the user interface and relationship between the components; and rendering the user interface based on the virtual component tree.

9. The computer system of claim 8, wherein the determining the operation for the first component based on the rule and the feature of the first component comprises:

in response to the feature of the first component complying with a first condition of the rule, determining the operation to be update;

in response to the feature of the first component complying with a second condition of the rule and no alternative component of the first component existing, determining the operation to be hiding; or in response to the feature of the first component complying with a second condition of the rule and a second component existing as an alternative of the first component, determining the operation to be replacement.

10. The computer system of claim 9, wherein the constructing the virtual component tree according to the operation comprises:

in response to the operation being determined as update, adding the first component to the virtual component tree;

in response to the operation being determined as hiding:

constructing the virtual component tree without the first component; or adding the first component to the virtual component tree, and assigning, by one or more processors, a label to the first component, wherein the label indicates the first component not included in the user interface; and in response to the operation being determined as replacement, adding the second component to the virtual component tree.

11. The computer system of claim 10, wherein the adding the first component to the virtual component tree comprises:

in response to no component to be replaced by the first component existing in the virtual component tree, adding the first component to the virtual component tree; or in response to a component to be replaced by the first component existing in the virtual component tree, adding the first component to the virtual component tree replacing the component to be replaced.

12. The computer system of claim 10, wherein the adding the second component to the virtual component tree comprises:

obtaining another rule corresponding to the second component;

determining another operation for the second component based on the another rule and a feature of the second component; and constructing the virtual component tree according to the another operation.

13. A computer program product, comprising a computer readable storage medium having program instructions embodied therewith, the program instructions executable by a processor to cause the processor to perform actions of:

obtaining a rule corresponding to a first component of a user interface, wherein the first component represents one or more resources provided to a user;

determining an operation for the first component based on the rule and a feature of the first component, the operation includes at least one selected from a group consisting of hiding, updating and replacement, the determining the operation for the first component based on the rule and the feature of the first component comprises:

in response to an operation of a parent component of the first component being determined as hiding, determining, by one or more processors, the operation of the first component to be hiding;

constructing a virtual component tree according to the operation, wherein the virtual component tree depicts components to be included in the user interface and relationship between the components; and rendering the user interface based on the virtual component tree.

14. The computer program product of claim 13, wherein the determining the operation for the first component based on the rule and the feature of the first component comprises:

in response to the feature of the first component complying with a first condition of the rule, determining the operation to be update;

in response to the feature of the first component complying with a second condition of the rule and no alternative component of the first component existing, determining the operation to be hiding; or in response to the feature of the first component complying with a second condition of the rule and a second component existing as an alternative of the first component, determining the operation to be replacement.

15. The computer program product of claim 14, wherein the constructing the virtual component tree according to the operation comprises:

in response to the operation being determined as update, adding the first component to the virtual component tree;

in response to the operation being determined as hiding:

constructing the virtual component tree without the first component; or adding the first component to the virtual component tree, and assigning, by one or more processors, a label to the first component, wherein the label indicates the first component not included in the user interface; and in response to the operation being determined as replacement, adding the second component to the virtual component tree.

* * * * *